US010519852B2

(12) United States Patent
Shawe et al.

(10) Patent No.: US 10,519,852 B2
(45) Date of Patent: *Dec. 31, 2019

(54) SUPERCHARGING ARRANGEMENT WITH A SUPERCHARGER AND VARIABLE-SPEED DRIVE UNIT

(71) Applicant: ALLISON TRANSMISSION, Inc., Indianapolis, IN (US)

(72) Inventors: James Shawe, Lancashire (GB); John Fuller, Lancashire (GB); Brian Dutson, Manchester (GB); Andrew Defreitas, Lancashire (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/760,310

(22) PCT Filed: Jan. 10, 2014

(86) PCT No.: PCT/EP2014/000247
§ 371 (c)(1),
(2) Date: Jul. 10, 2015

(87) PCT Pub. No.: WO2014/108345
PCT Pub. Date: Jul. 17, 2014

(65) Prior Publication Data
US 2015/0354445 A1 Dec. 10, 2015

Related U.S. Application Data

(63) Continuation-in-part of application No. PCT/EP2013/050425, filed on Jan. 10, 2013, which is
(Continued)

(30) Foreign Application Priority Data
Jan. 10, 2013 (GB) .................................. 1300453.6

(51) Int. Cl.
F02B 39/04 (2006.01)
F16H 15/38 (2006.01)
(Continued)

(52) U.S. Cl.
CPC .............. F02B 39/04 (2013.01); F02B 39/12 (2013.01); F02D 23/005 (2013.01); F16H 15/38 (2013.01)

(58) Field of Classification Search
CPC ........ F02B 39/04; F02B 39/12; F02D 23/005; F16H 15/38; B62M 11/16
(Continued)

(56) References Cited

U.S. PATENT DOCUMENTS 3,394,617 A 7/1968 Dickenbrock
2004/0216519 A1* 11/2004 Baeuerle ................. F02B 39/16
73/114.38
(Continued)

FOREIGN PATENT DOCUMENTS

WO 2008002457 1/2008
WO 2008002457 A2 1/2008
(Continued)

OTHER PUBLICATIONS

International Search Report; corresponding International application No. PCT/EP2013/050431; dated Apr. 15, 2013.
(Continued)

Primary Examiner — Mark A Laurenzi
Assistant Examiner — Paul W Thiede
(74) Attorney, Agent, or Firm — Taft Stenttinius & Hollister LLP; Stephen F. Rost

(57) ABSTRACT

A supercharging arrangement for an internal combustion engine is disclosed. The supercharging arrangement comprises a supercharger having a rotational drive input, and a transmission having a rotational drive input to receive drive
(Continued)

from an internal combustion engine, and a rotational drive output connected to the input of the supercharger. The transmission includes a variator operatively connected between the input and the output of the transmission, which variator has an output that is driven at an operating ratio from an input. There is a control system that operates to cause an engine to deliver an amount of torque that is indicated by the state of an input to the control system. The control system is further operative to set the operating ratio of the variator.

20 Claims, 12 Drawing Sheets

Related U.S. Application Data a continuation-in-part of application No. PCT/EP2013/050431, filed on Jan. 10, 2013, which is a continuation-in-part of application No. PCT/EP2013/050433, filed on Jan. 10, 2013.

(51) Int. Cl.
*F02B 39/12* (2006.01)
*F02D 23/00* (2006.01)

(58) Field of Classification Search
USPC ........................................ 123/559.1; 475/189
See application file for complete search history.

(56) References Cited

U.S. PATENT DOCUMENTS

| | | | |
|---|---|---|---|
| 2010/0267510 A1 | 10/2010 | Nichols et al. | |
| 2012/0000446 A1 | 1/2012 | Venton-Walters et al. | |
| 2013/0187009 A1* | 7/2013 | Golling | B64C 21/04 244/203 |
| 2014/0074366 A1* | 3/2014 | Cui | F16H 63/065 701/61 |
| 2014/0349806 A1* | 11/2014 | De Freitas | F16H 15/38 476/50 |
| 2015/0345413 A1* | 12/2015 | Shawe | F02B 33/34 123/559.3 |

FOREIGN PATENT DOCUMENTS

| | | |
|---|---|---|
| WO | 2008120687 A1 | 10/2008 |
| WO | 2011064572 | 6/2011 |
| WO | 2011064572 A2 | 6/2011 |

OTHER PUBLICATIONS

Written Opinion of the International Searching Authority; corresponding International application No. PCT/EP2013/050431; date of completion of report Apr. 15, 2013.
International Preliminary Report on Patentability; corresponding International application No. PCT/EP2013/050431; date of completion of report May 5, 2014.
International Search Report; corresponding International application No. PCT/EP2013/050425; dated Apr. 15, 2013.
Written Opinion of the International Searching Authority; corresponding international application No. PCT/EP2013/050425; date of completion of report Apr. 15, 2013.
International Preliminary Report on Patentability; corresponding International application No. PCT/EP2013/050425; date of completion of report May 2, 2014.
International Search Report; corresponding International application No. PCT/EP2013/050433; dated Mar. 26, 2013.
Written Opinion of the International Searching Authority; corresponding International application No. PCT/EP2013/050433; date of completion of report Mar. 26, 2013.
International Preliminary Report on Patentability; corresponding International application No. PCT/EP2013/050433; date of completion of report May 2, 2014.
International Preliminary Report on Patentability; International Searching Authority; International Patent Application No. PCT/EP2014/000247; dated Jul. 14, 2015; 5 pages.
European Office Action; European Patent Office; European Patent Application No. 14704075.2; dated Jun. 13, 2018; 5 pages.
Indian First Examination Report; Intellectual Property India; Indian Patent Application No. 7001/DELNP/2015; dated Apr. 30, 2019; 7 pages.

* cited by examiner

SUPERCHARGING ARRANGEMENT WITH A SUPERCHARGER AND VARIABLE-SPEED DRIVE UNIT

CROSS REFERENCE TO RELATED APPLICATIONS

This application is the U.S. national phase of PCT Application No. PCT/EP2014/000247 filed Jan. 10, 2014 which claims priority to GB 1300453.6 filed Jan. 10, 2013; PCT/EP2013/050425 filed Jan. 10, 2013; PCT/EP2013/050431 filed Jan. 10, 2013 and PCT/EP2013/050433 filed Jan. 10, 2013. The disclosures of these cases are incorporated in their entirety by reference herein.

BACKGROUND OF THE INVENTION

(1) Field of the Invention

The present invention relates to a drive arrangement for a supercharger. In particular, it relates to a drive arrangement for a supercharger in which drive is transmitted from an internal combustion engine to a supercharger through a drive system that includes a continuously-variable transmission (CVT).

The invention has particular application to passenger cars and light road vehicles. While this is not the only application of the invention, this application will be used as a basis for description of how the invention might be implemented. In this regard, embodiments of the invention will typically be used on an engine that is controlled by a driver using a foot pedal that allows a driver to control the amount of torque that the engine will cause to be delivered to the vehicle's transmission. In the case of a petrol engine, this pedal will directly or indirectly control the position of a throttle that regulates flow of air into the engine, while in the case of a diesel engine, the pedal will directly or indirectly control the amount of fuel that will be injected into the engine. Therefore, in this specification, the commonly-used term "accelerator pedal" will be used to refer generally to such a pedal independently of its actual, physical effect on the operation of the engine.

(2) Description of Related Art

Forced induction is seen as making an important contribution to improving the efficiency of internal combustion engines. In particular, superchargers driven from the engine (as contrasted with exhaust-driven turbochargers) can offer a considerable degree of control over the amount of air entering the engine at any given time.

In general, the rotational speed at which the supercharger must be driven is greater than the rotational speed of the crankshaft of the engine by a large factor. For example, a typical petrol engine for a passenger car will operate at speeds between 750 and 6000 rpm, while a centrifugal supercharger might be required to operate at between 40 000 and 250 000 rpm. Hitherto, this has typically been achieved by providing a step-up gear train of fixed ratio between the crankshaft and the supercharger.

It is apparent that causing the supercharger to be driven at a fixed multiple of the crankshaft speed is not optimal. If the supercharger system is configured to deliver the maximum possible engine torque at low engine speed then the power is wasted at high engine speed. If the compressor is geared such that it supplies the maximum possible engine torque at high engine speed then engine torque at low engine speed may be insufficient. A variable ratio drive between the crankshaft and the supercharger could be used to reduce the amount of wasted energy that is delivered to the supercharger whilst maximising torque output at low engine speeds. A continuously-variable ratio drive is advantageous over a step-change ratio drive.

Consider now the situation where an engine is operating to drive a vehicle at substantially steady speed using a small percentage of the engine's available torque, and the driver suddenly depresses the accelerator pedal, for example to overtake a slower vehicle. Ideally, the supercharger would be accelerated to its maximum speed in as short a time as possible to answer the driver's request for maximum engine torque. In response to such a demand, if a variable-ratio drive is immediately swept from a low to a high ratio, a substantial part of the output torque of engine might be required just to accelerate the supercharger, and will therefore be unavailable to accelerate the vehicle. Without proper control, it is possible to imagine a situation where so much torque is absorbed by the supercharger drive, a sudden accelerator pedal input could actually result in a transient reduction in the torque delivered to the driving wheels. This is highly undesirable.

A continuously-variable transmission system incorporating a variator that is torque-controlled might provide a straightforward solution to this control problem. Such variators are known to those skilled in the technical field and are typically, but not exclusively, of the toroidal traction drive type. The control input to the transmission can control the maximum inertial (or accelerating) torque that will be delivered to the supercharger, and this can be set to a predetermined maximum, or a proportion (that could be fixed or variable) of the total current engine torque. However, such variator systems are costly and heavy to implement, since they typically require an actuator that is capable of delivering significant power to a roller carrier of the variator, and associated hydraulic control apparatus are required. Therefore, while such a transmission might solve the control problem, it may not provide an acceptable solution for use in a passenger car, where cost and weight must be kept to a minimum.

BRIEF SUMMARY OF THE INVENTION

The aim of this invention is to provide an arrangement whereby a supercharger can be driven through a continuously-variable transmission from an internal combustion engine that is capable of providing the required degree of control for effective operation while keeping cost, weight and complexity to a minimum.

To this end, from a first aspect this invention provides a supercharging arrangement for an internal combustion engine comprising:
  a supercharger having a rotational drive input;
  a transmission having a rotational drive input to receive drive from an internal combustion engine, and a rotational drive output connected to the input of the supercharger; wherein
  the transmission includes a variator operatively connected between the input and the output of the transmission, which variator has an output that is driven at an operating ratio from an input;
  in which
  the control system operates to cause an engine to deliver an amount of torque that is indicated by the state of an input to the control system, and preferably the control means is operative to set the operating ratio of the variator.

In arriving at this invention, the inventors realised that the disadvantages of operation of the variator under ratio control, as compared with the clearly preferable torque control, can be overridden by the savings in cost and weight that are achieved by the comparative simplicity and low power required to operate under ratio control. Operation under torque-control allows simple implementation of a control system (all it must do is set a limit on the torque that will be applied to the engine or the supercharger) ratio control presents a considerably greater technical challenge.

In general, the control system must operate to cause the engine to deliver an amount of torque that is indicated by states of one or more inputs to the control system. Such inputs may be directly determined by a person (such as an accelerator pedal of a vehicle), an automated control such as a cruise control or autopilot, other vehicle control systems (such as stability control systems), an engine speed governor (which itself may be mechanical or an integral part of an engine control system) or the vehicle powertrain system which may comprise one or more of an automatic or automated gearbox, infinitely variable transmissions and CVTs (of which examples include mechanical, electric or hydraulic variants), energy storage systems (for example mechanical types (for example a flywheel), electric types (for example a battery) or hydraulic types (for example an accumulator), or other driven devices such as air compressors, air conditioning systems, alternators, oil pumps and any power take-off driven implements. From this, and knowledge of instantaneous operating conditions, the control system may calculate a target value for a control variable representative of the state of operation of an internal combustion engine associated with the supercharging arrangement. With knowledge of the engine speed, the control system may operate to calculate a target variator ratio such that speed at which the supercharger operates approaches that to achieve the value of the control variable.

The control system can further operate to adjust the variator ratio to ensure that the rate at which the supercharger speed changes does not exceed a predetermined limit, for example to ensure that the torque that is applied to the output of the engine or to the variator does not exceed a threshold. For example, this may be one or more of a proportion of the total currently available engine torque or a fixed maximum value. For example, the control system may operate to accelerate the supercharger at a rate that is a function of the error value that is the difference between the target speed and the current speed of the supercharger. This function may be a proportional type where the accelerating torque applied to the supercharger increases with increasing error value, and decreases with decreasing error value. Such an arrangement would cause the supercharger to approach the target speed asymptotically so that there are no step changes in torque applied the engine crank.

The variator may be of the hydrostatic type (incorporating a pump and a motor), an electric motor-generator CVT, a variable belt drive CVT, a variable chain drive CVT, a ball bearing traction drive (examples include GB-A-2394519 and U.S. Pat. No. 6,551,210), and in the case of mechanical drives, may be of the friction-drive or traction-drive type. In typical embodiments, the variator is a toroidal variator. Most typically, the variator may be a full toroidal variator in which drive between elements of the variator occurs through a traction fluid. Specifically, the variator may typically comprise: an input surface and an output surface, the input and output surfaces being coaxially mounted for rotation about a variator axis, and a toroidal cavity being defined between the working surfaces; a plurality of rolling elements disposed between and being in driving engagement with the input and the output surfaces at respective contact regions, each rolling element being mounted on a carriage assembly for rotation about a rolling axis, each rolling element being free to pivot about a tilt axis, the tilt axis passing through the rolling element perpendicular to the rolling axis, and intersecting the rolling axis at a roller centre, whereby a change in the tilt angle causes a change in the variator ratio being the ratio of rotational speeds of the races.

Cost and weight can be further optimised by choice of variator configuration. In particular, variators that require very low power for actuation during ratio change are advantageous. This allows the variator to be actuated with a low-cost actuator, for example an electrically-powered actuator. Variators that accomplish ratio change by causing the rollers to rotate about a pitch axis, a mechanism that the applicants refer to as "tilt steer" are particularly suited to this application. Therefore, in preferred embodiments of the invention, in the variator, each carriage assembly can cause pivotal movement, which pivotal movement about a pitch axis that results in a change of a pitch angle of the rolling element, the pitch axis passing through the roller centre and through the contact regions; and the variator further comprising a control member operative to cause a respective carriage assembly to undertake the said pivotal movement thereby changing the pitch angle, so urging the plurality of rolling elements to pivot about their tilt axes and thereby provide a change in variator ratio.

The or each toroidal cavity of the variator advantageously contains no more than two rolling drive elements. The variator may further comprise a reaction member operatively coupled to the plurality of rolling elements such that it bears the reaction torque from the rolling elements within the toroidal cavity.

In embodiments of the invention, the variator may include two similar cavities, whereby it comprises a second input surface and a second, facing output surface defining a second toroidal cavity; a second plurality of rolling elements disposed between the second input and second output surfaces and being in driving engagement with the surfaces, each rolling element being rotatably mounted on its respective carriage assembly and able to tilt about an axis passing through the centre of the rolling element in order to change the variator ratio and being mounted for pivotal movement resulting in the rolling element pitching about an axis passing through the centre of the rolling element and perpendicular to the rotational axis of the rolling element and also perpendicular to the ratio change axis; a control member for actuation of each carriage assembly to pitch the respective rolling element resulting in a change of tilt angle and a change in variator ratio; a first reaction member operatively coupled to the plurality of rolling elements in the first cavity and a second reaction member operatively coupled to the second plurality of rolling elements in the second cavity such that the first and second reaction members bear reaction loads arising from the respective rolling elements.

The variator may further comprise a load-sharing assembly operatively linked to the reaction members of the first and second cavities such that reaction torque from the reaction members is balanced.

Typical embodiments of the invention further comprise a step-up gearset coupled in series with the variator. The step-up gearset is typically connected between the variator and the supercharger. The step-up gearset may include a traction drive epicyclic gearset, and in those embodiments, it may share traction fluid with the variator.

The variator may include a torque sensing arrangement that is operative to reduce the ratio of the variator when the torque applied by the variator to the supercharger exceeds a threshold. This arrangement can serve to protect the variator against damage from excessive torque.

The supercharger may incorporate a dynamic compressor (for example a centrifugal compressor or axial compressor) or a positive-displacement compressor (such as a screw type, scroll type or lobe pump) and may incorporate a plurality of compressors of similar or different types. A preferred embodiment comprises a centrifugal compressor.

From a second aspect, this invention provides a drivetrain for a vehicle (not shown) comprising an internal-combustion engine and that has an induction system that incorporates a supercharging arrangement with is an embodiment of the invention from its first aspect.

The control system generally operates to cause the variator to operate at a ratio that causes a control variable, for example a control variable of the drivetrain, to approach a target value. The control variable may be one or more of a compressor speed of the supercharger, supercharger boost pressure, manifold air pressure, mass air flow, engine output speed or engine output torque.

BRIEF DESCRIPTION OF THE SEVERAL VIEWS OF THE DRAWINGS

Embodiments of the invention will now be described in detail, by way of example, and with reference to the accompanying drawings, in which.

DETAILED DESCRIPTION OF THE INVENTION

Figure 1:
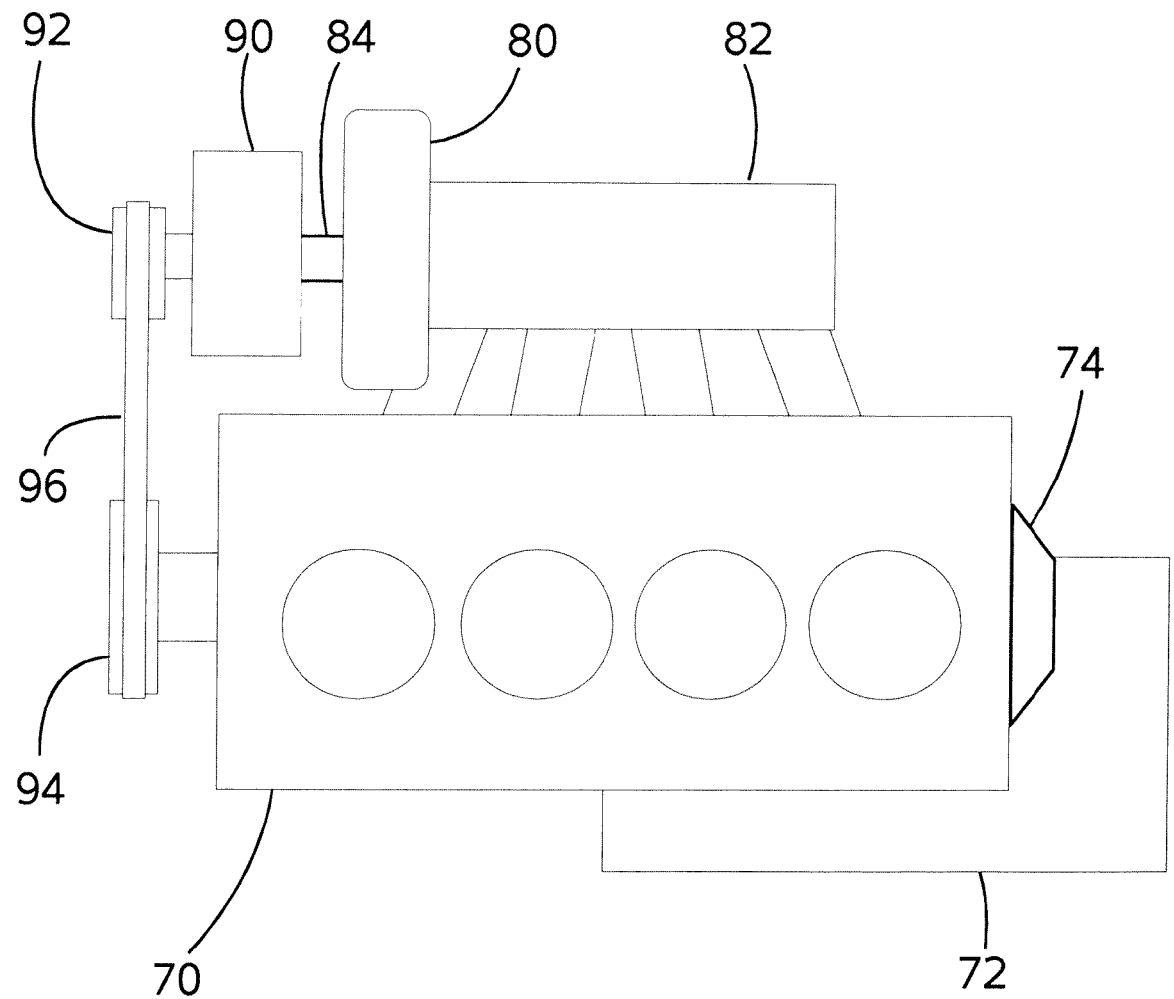
FIG. 1 is a highly diagrammatical representation of a vehicle drive system including a supercharger and a drive arrangement for a supercharger embodying the invention.
Figure 2:
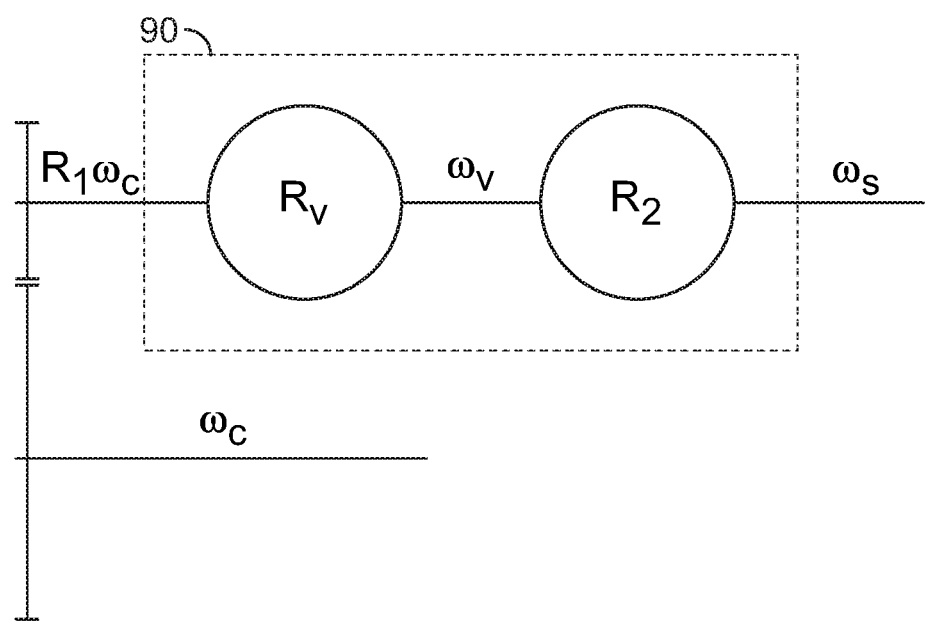
FIG. 2 is a diagram of a drive unit being a component of an the embodiment of FIG. 1.
Figure 3:
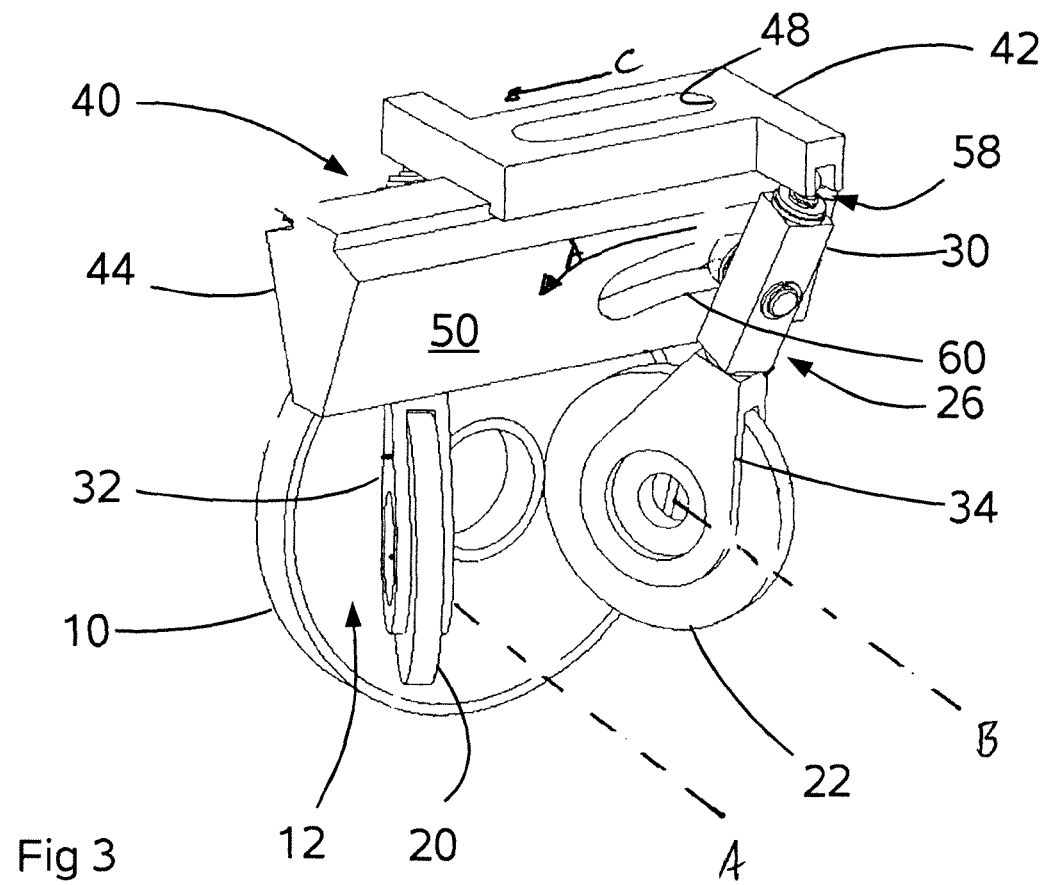
FIG. 3 is a perspective view of part of a first variator that is suitable for use in embodiments of the invention.

With reference to FIG. 1, a drive system for a vehicle, such as a passenger car, comprises an internal combustion engine 70, normally fuelled by petrol or diesel fuel, but alternatively by liquid petroleum gas, ethanol, or a variety of other combustible fuels. A main drive from the engine 70, typically derived from an output at one end of a crankshaft, is connected to an input of a variable-speed transmission 72, typically through a coupling 74 such as a friction clutch or a torque converter. The variable-speed transmission 72 may be continuously-variable between a minimum and a maximum ratio, or may have a plurality of discrete ratios, and may be controlled manually by a driver or automatically. In embodiments where the transmission 72 is continuously-variable, it may have a "geared neutral" ratio, at which its output is stationary irrespective of the speed of its input. In such embodiments, the coupling 74 may be omitted. The output of the transmission 72 is connected to the input of a final drive system that, in turn, transmits drive to road wheels of a vehicle. The final drive system may drive two wheels of a vehicle (two front wheels or two rear wheels) or may drive all wheels of a vehicle, typically splitting drive through a transfer box.

The above describes just a range of typical configurations of a drive system that may embody the invention. Other arrangements are possible, using different arrangements of variable-speed transmission or final drive, and the drive system may be incorporated into a drive in a large range of applications where an internal combustion engine is a prime mover.

The internal combustion engine 70 has an induction system that has a supercharging arrangement. The supercharging arrangement comprises a supercharger 80. The supercharger 80 draws in air through an intake at approximately ambient atmospheric pressure, and delivers air to an inlet manifold 82 of the engine 70 at a pressure that is greater than the pressure at the intake by a pressure difference that depends upon the speed of rotation of a drive shaft 84 of the supercharger 80. Air that passes through the supercharger 80 normally also passes through an air filter and an air-flow meter, and, in the case of a spark-ignition engine, a throttle body. Any or all of these components can be disposed either downstream or upstream of the supercharger 80.

The drive shaft 84 of the supercharger is driven from the crankshaft of the engine 70 from an output shaft of a variable-speed drive unit 90. The drive unit 90 has an input shaft that is driven by the crankshaft of the engine 70. In this embodiment, the input shaft of the drive unit 90 carries a pulley 92 that is connected through a drive belt 96 to a crankshaft pulley 94 that is carried on one end of the crankshaft of the engine 70. The drive belt 96 may also drive other ancillaries, such as an alternator, an air-conditioning pump, a power steering pump, etc.

The purpose of the drive unit 90 is to ensure that the drive shaft 84 of the supercharger 80 is turned at a speed that most nearly approaches an optimum for any given condition of operation of a vehicle drive system. As drive is taken from the crankshaft of the engine to the drive shaft 84 of the supercharger 80, there are three principal stages at which the speed of drive is changed. First, the drive from the crankshaft will drive the input shaft of the drive unit 90 at a speed ratio $R_1$; second, within the drive unit 90, there is a fixed ratio stage $R_2$; and third, within the drive unit, there is a variable ratio stage $R_V$, such that the instantaneous speed $\omega_s$ of the drive shaft 84 of the supercharger 80 is calculated from the speed of the crankshaft $\omega_c$ by $\omega_s = \omega_c \, R_1 \, R_2 \, R_V$. Since $R_1 \, R_2$ are constants that are calculated as part of the design of the drive system, control of the drive system involves calculating instantaneous optimal value of $R_V$, and causing the variable-ratio stage to operate with a ratio of value $R_V$.

In preferred embodiments that are particularly, but not exclusively, for use with centrifugal superchargers, the variable ratio stage $R_V$ of the drive unit comprises a ratio-controlled full-toroidal variator, and the fixed ratio stage $R_2$ comprises a traction epicyclic drive. Thus, the shaft of the drive unit 90 drives the input to a variator, the variator has an output that drives the input to an epicyclic gearset, and the epicyclic gearset has an output that is connected to the drive shaft 84 of the supercharger 80.

While a wide variety of ratio-controlled variators that are capable of operating in the required speed range and handling the required power can be used in embodiments of the invention, there is a strong incentive to minimise its manufacturing cost and power required for actuation, particularly when used in an automotive application. A range of variators in which ratio is controlled by changing the pitch of rollers in the variator has been found to be particularly advantageous. Several such variators will now be described.

FIGS. 3 to 6 show different views of a part of a variator embodying the invention. The variator comprises an input race 10, shaped generally as an annulus. The input race 10 has an inner surface within which annular recess 12 of arcuate cross-section is formed to provide a working surface of the input race 10. The variator further comprises an output race (not shown) that is substantially similar to the input race 10. The input race 10 and the output race are disposed coaxially on a variator axis V, with their working surfaces facing one another, thus forming a toroidal cavity between the races that is bounded by their working surfaces. Each of the races is mounted for rotation about the variator axis V.

Rolling elements, in this case in the form of approximately cylindrical rollers 20, 22 with suitably profiled outer rolling surfaces are disposed for operation within the toroidal cavity. In this embodiment, there are two such rollers, but it will be understood that a greater number could alternatively be provided.

Each roller 20, 22 is mounted on a respective roller carriage assembly 24, 26. Each roller carriage assembly 24, 26 includes a stem 28, 30 and a fork 32, 34. Each fork 32, 34 carries a respective roller 20, 22 such that the roller 20, 22 can rotate on a bearing for rotation about a rolling axis that extends through its centre. Within each roller assembly 24, 26, each fork 32, 34 can rotate on its stem 28, 30 about a respective tilt axis that is normal to its rolling axis.

Figure 4:
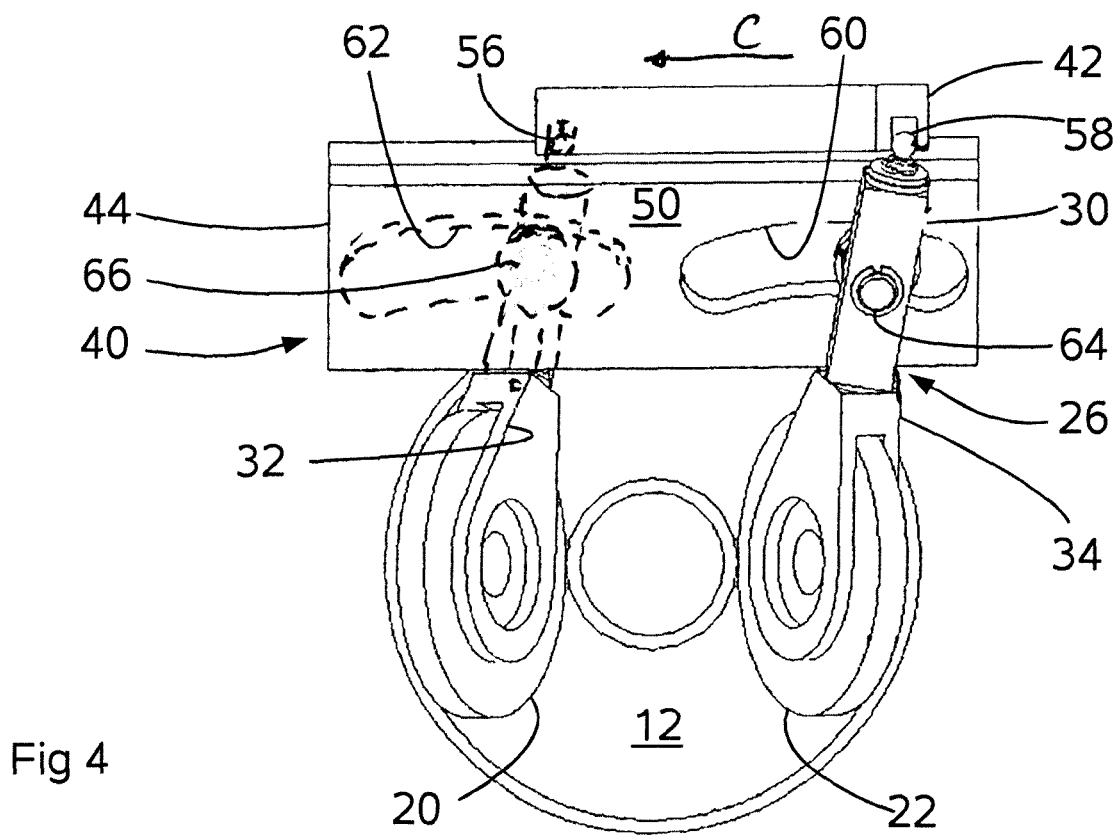
FIG. 4 is a control assembly of the part of the variator shown in FIG. 3.
Figure 5:
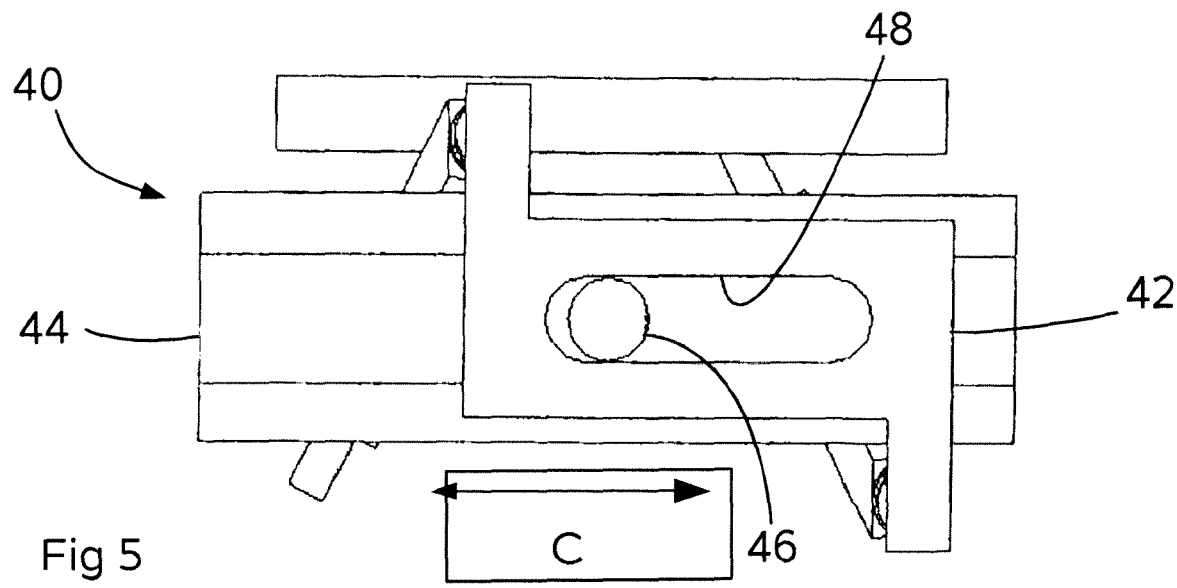
FIG. 5 is a top view of the part of the variator shown in FIG. 3.
Figure 6:
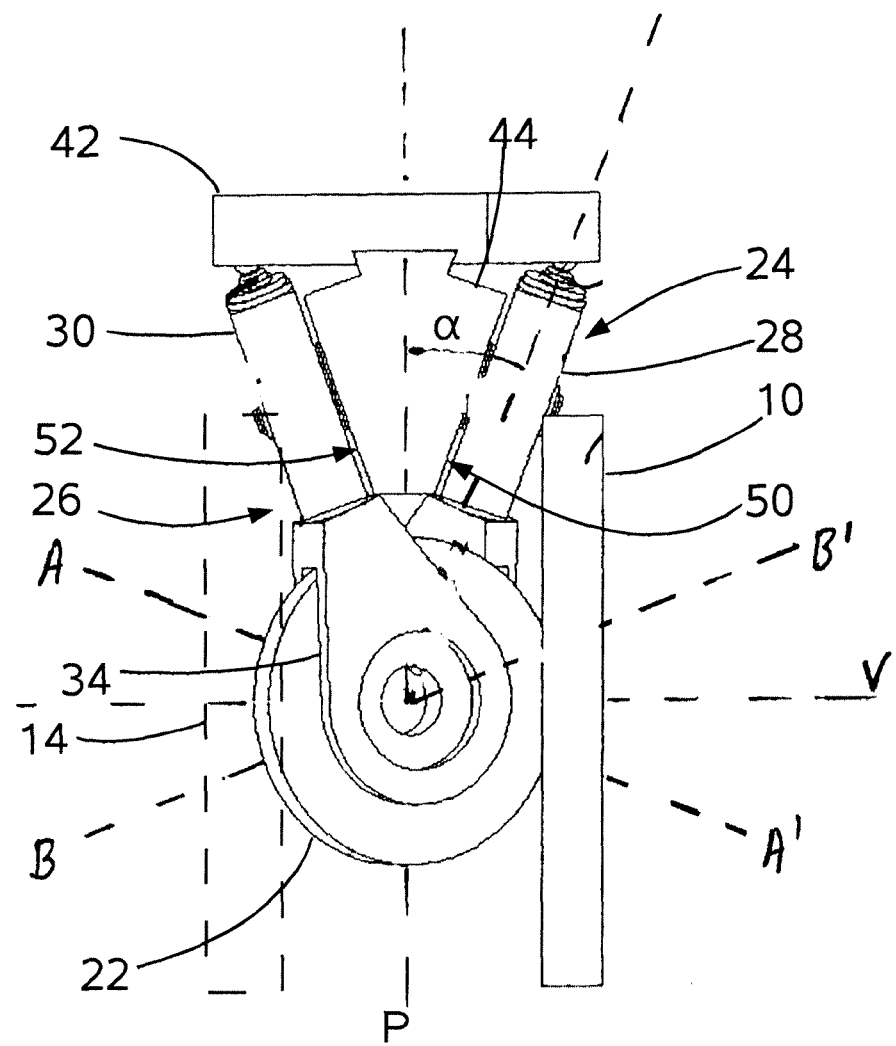
FIG. 6 is a side elevation of the part of the variator shown in FIG. 3.

Each carriage assembly 24, 26 is mounted such that the tilt axis of the stems 28, 30 is inclined to a plane P as shown in FIG. 4. The plane P is perpendicular to the variator axis at an angle "α" known as the castor angle, as shown on FIG. 4. Each roller 20, 22 is free to pivot about the respective tilt axis, being the longitudinal axis of the stem 28, 30, which passes through the centre of the roller 20, 22—that is to say, the castor angle is the angle between the tilt axis and the centre plane of the variator.

The input race 10 is driven by and transmits drive to the output race 14 through the rollers 20, 22 which are in driving engagement between the races.

The variator includes a control assembly 40 which comprises a slider 42 carried on a support 44. The slider 42 is adapted for reciprocal linear movement relative to the fixed part 44. A peg 46 projects from the support 44 through a slot 48 in the slider 42 such that it acts as a stop to limit the range of movement of the slider 42 on the support. The control assembly 40 is adapted to provide control actuation of the variator by translational movement. The slider 42 is able to travel back and forth along the support 44 in a direction indicated by arrow C, in a plane perpendicular to the variator axis. In this embodiment, the slider 42 is connected to each roller carriage assembly 24, 26 at a location radially outward of a cylindrical plane which is parallel to the variator axis V and tangential to the periphery of the larger of the input race 10 and output race 14. In an alternative embodiment, the carriage assemblies 24, 26 may each be actuated by their own actuator. The support 44 has reaction surfaces 50, 52 that are each inclined at the castor angle α to the centre plane of the variator perpendicular to the variator axis V.

The control assembly 40 is operatively coupled to the carriage assemblies 24, 26 by actuation joints 56, 58. The actuation joints 56, 58 constrain upper end parts of each stem 28, 30 to move linearly with the slider 32 while allowing the stems 28, 30 to pivot with respect to the slider 32. The single control assembly 40 controls both carriage assemblies 24, 26 in unison. The carriage assemblies 24, 26 are also coupled to the control assembly 40 at respective reaction points. Each reaction point comprises an arcuate slot 60, 62 that extends into a respective reaction surface 50, 52 of the support 44. The stem 28, 30 of each of the carriage assemblies 24, 26 carries a projecting reaction pin 64, 66 that extends into a respective arcuate slot, in which it is a close sliding fit with sufficient to allow free sliding engagement of each reaction pin 64, 66 in its slot 60, 62. The stem may be equipped with rollers to provide smooth engagement and a rolling engagement with the slot.

(In an alternative arrangement, the arcuate slots may be arranged perpendicular to the stems 28, 30 with the stem passing through the slot and forming the engaging part which cooperates with the slot to locate the roller carriage.)

Each roller 20, 22 and its carriage assembly 24, 26 together have four points of contact with the variator; contact between the roller 20, 22 at the working surface of the input race, the working surface of the output race 14, with the control assembly 40 at the actuation joint 58, 58, and the reaction point through the reaction pin 64, 66 and its respective slot 60, 62. Each carriage assembly 24, 26 is located within the toroidal cavity by the two points of contact with the control assembly 40 and by the contact between the roller and the working surfaces of the input and output races. These points of contact mean that the carriage assemblies 24, 26 are mounted such that they are able to move pivotally to vary a pitch angle about a respective steering axis A-A, B-B' passing through the centre of the rollers 20, 22 and perpendicular to the plane of movement of the slider 44. This steering axis is perpendicular to the tilt axis of the carriage assembly. The carriage assemblies carriage assembly 24, 26 are actuated through the actuation joints 56, 58, situated radially distant from the roller pivot axes, such that the carriage assemblies 24, 26 sweeps through an arc centred on the axis A-A, B-B'. The rollers are guided by the engagement of engagement parts 14, 24 with slots 33, 34. The roller carriages 14, 24 are constrained to the pivotal movement by the coupling of the reaction pins 64, 66 in their slots 60, 62 about the reaction point. The arrangement allows reaction torque from the rollers 20, 22 to be borne.

The pivoting motion of the carriage assemblies that occurs as the slider 44 moves imparts to the rollers 20, 22 a component of rotation about their tilt axis (that is, an axis passing through the centre of the roller and which is parallel to the variator axis V). The pivoting motion also imparts a component of rotation about an axis perpendicular to the tilt axis, referred to as a ratio change axis. This rotation allows each roller 20, 22 to alter its tilt so as to change the speed ratio and may momentarily experience contact forces from the input and output surfaces. The mounting of the roller 20, 22 in a fork 32, 34 such that is may rotate about its precession axis enables the roller 20, 22 to tilt so as to find a path of least resistance to reach equilibrium so as to change the variator ratio. In this way, through the combination of the pivotal movement of the carriage assembly and the freedom of rotation about the tilt axis, the roller is free to undergo a tilting motion to provide a change in variator speed ratio. The rollers 20, 22 are therefore able to steer (that is, to vary their tilt) in response to an actuation force by pitching about an axis parallel to the variator axis and alter their position to change the speed ratio of the variator. To achieve optimal pivoting movement that minimises any component that serves to change the roller tilt and therefore the variator ratio, the slots 60, 62 are formed such that when their shape is projected onto a plane normal to the variator axis is an arc centred on the variator axis.

In another embodiment, each carriage assembly comprises a stem alone with the rollers being mounted on the end of the stem through a gimbal. In this arrangement each roller 20, 22 is mounted on its respective carriage assembly by a pivoting joint passing through the roller centre such that the roller is free to tilt about its tilt axis. The stem suitably lies in the centre plane P of the variator and the gimbal arrangement provides the castor angle and degrees of freedom for the roller 20, 22 to freely tilt.

Figure 7:
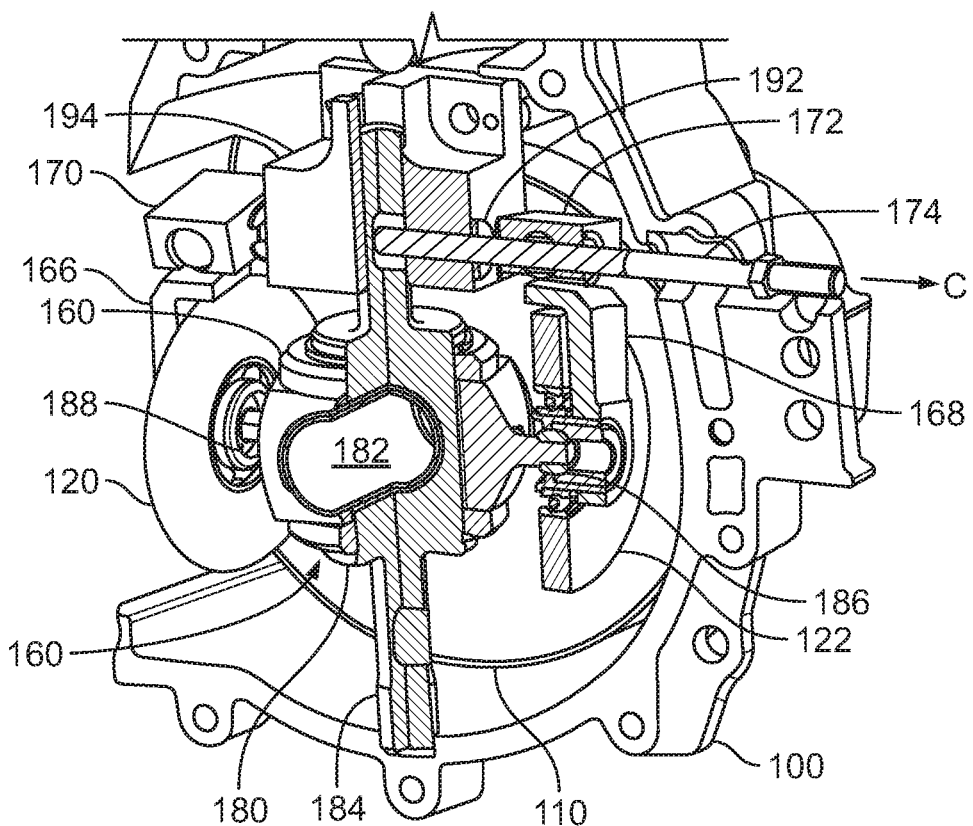
FIGS. 7 and 8 are perspective and part cut-away views of part of a second variator that is suitable for use in embodiments of the invention.
Figure 8:
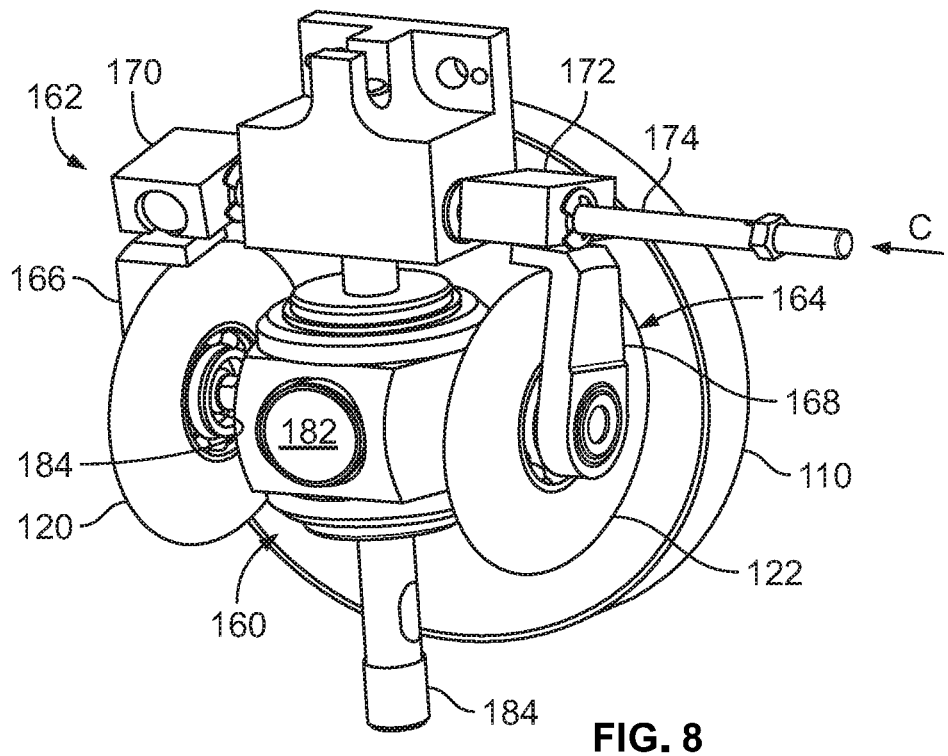

FIGS. 7 and 8 illustrate part of a variator that includes a reaction member 160 operatively coupled to the rollers 120, 122 that transmit drive between the input race 110 and the output race (not shown). The purpose of the reaction member is to bear reaction torque from the rollers 120, 122. The rollers 120, 122 are mounted on carriage assemblies 162, 164. Each carriage assembly comprises a carrier 166, 168 and a mounting part 170, 172. Each roller 120, 122 is carried for rotation about its axis on a respective carrier 166, 168. Each carrier 166, 168 is pivotally connected to the respective mounting part 170, 172.

Each mounting part 170, 172 is carried on an elongate control member 174, such that it is prevented from lineal movement along the control member 174. The control member 174 may move in a linear, reciprocal manner in direction C, causing the mounting parts 170, 172 also to move in direction C. (In this embodiment, the control member does not comprise a movable and a fixed part with the slot arrangement shown in FIGS. 1 to 4.) Each carriage assembly is located within the toroidal cavity by the connection between the mounting parts 170, 172 and the control member 174, and by reaction point at the centre of the roller 120, 122 by its contact with the reaction member 160. In this embodiment reaction torque is borne by the reaction member 160 and not by the control member 174.

The reaction member 160 comprises a body 180 having an aperture 182 through which a variator input shaft and/or output shaft may pass with clearance. Reaction shafts 184, 190 project coaxially and in opposite directions from the body 180 and are aligned normal to the variator axis within the centre plane of the variator. End portions of each reaction shaft 184, 190 are retained in apertures formed, respectively, in a casing 100 of the variator and a mounting block 194 secured to the casing 100 such that shafts 184, 190 can rotate within the apertures. As a couple is applied to the reaction member 160 it is caused to rotate, which would urge the shafts 184, 190 to rotate. However, by restraining the end portion of the shafts 184, 190 within the apertures, the reaction torque is resisted. The reaction member 160 is operatively linked to the centre of each roller 120, 122 by a spherical joint 186, 188 so as to transmit the reaction torque from the rollers 120, 122 to the reaction member 160 and to allow for relative pivotal movement between the rollers 120, 122 and the reaction member 160. The reaction member 160 is mounted for rotation about the variator axis in response to reaction torque arising from the disc/roller contact during rotation of the discs thereby changing the variator ratio.

The control member 174 passes through the reaction member 160 at an aperture 192 but is not linked to it. There is suitably sufficient clearance between the control member 174 and the aperture 192 to avoid fouling as reaction torque is borne and the reaction member rotates about the variator axis.

The reaction member 160 is movable radially of the variator axis and may be moved in a non-radial direction such that that the reaction member 160 balances reaction loads generated by each roller 120, 122 within the toroidal cavity.

The reaction member 160 may include a damper to dampen movement of the body 180 for example in a radial direction relative to the variator axis. A mechanical end stop may be provided to limit movement of the reaction member 160 in a radial direction relative to the variator axis.

Figure 9:
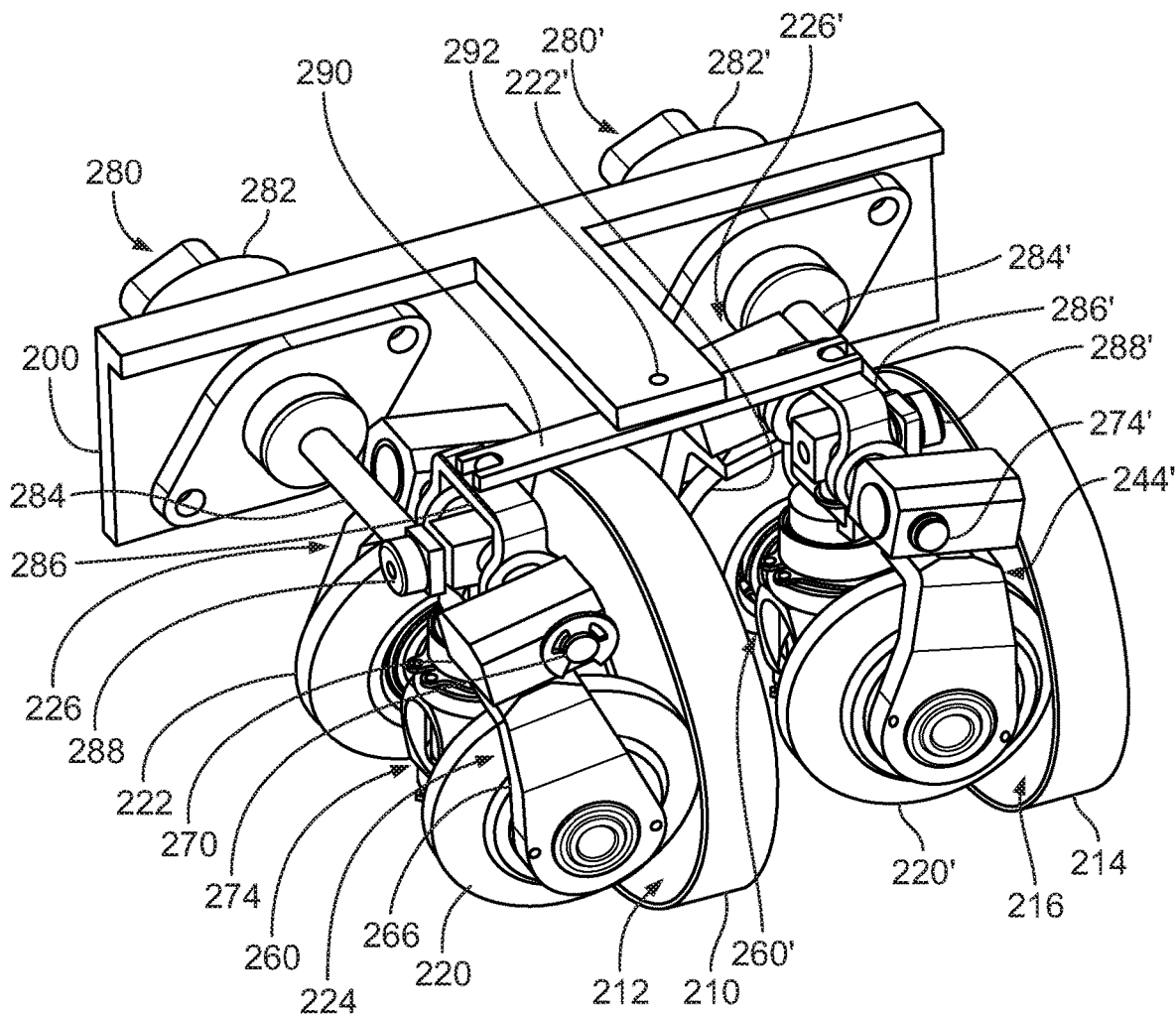
FIG. 9 is a perspective view of part of a third variator that is suitable for use in embodiments of the invention.

FIG. 9 shows a part of a twin-cavity variator embodying the invention. The variator comprises an input race 210 and similar first and second output races 214 (only one is shown) disposed, in the direction of the variator axis, to opposite sides of the input race 210. Each output race 214 has a working surface 216 that faces the input race 210. The input race 210 has first and second working surfaces 212 that face, respectively, the first and second output races 214. Therefore, two toroidal cavities are defined, a first between the input race 210 and the first output race 214, and a second between the input race 210 and the second output race.

A first set of rollers 220, 222 is provided within the first toroidal cavity to transmit drive between the input race 210 and the first output race, and a second set of rollers 220', 222' is provided within the second toroidal cavity to transmit drive between the input race 210 and the second output race 214. Each roller 220, 222; 220', 222' is mounted on a respective carriage assembly 224, 226; 224' 226'. Each carriage assembly comprises a carrier 266 and a mounting part 270. The roller 220 is mounted for rotation on the carrier 266. The carrier is connected to the mounting part 270 such that it is free to undergo a tilting motion to change the tilt angle of the rollers 220, 222; 220', 222' and thereby change the variator ratio. The respective carriage assemblies 224, 226; 224' 226' are mounted for pivotal movement about an axis that passes through the centre of the respective roller.

A respective actuator 280, 280' is associated with each cavity. Each actuator 280, 280' comprises a body 282, 282' that is fixed to a casing 200 of the variator, and an actuator rod 284, 284' that can be driven linearly into or out of the body by suitable application of an electrical signal or hydraulic fluid, as the case may be, to the actuator 280, 280'.

Within each cavity, the mounting parts 270 of the two carriage assemblies are 224, 226; 224' 226' are connected to a common control rod 274, 274, such that they are fixed to the control rod against linear movement, but can pivot with respect to it. Each control rod 274, 274' is connected to a respective actuator rod 284, 284' through joint 288, 288' that admits pivotal movement between the control rod and the actuator rod.

Thus, operation of the actuators 284, 284' causes linear movement of the control rods 274, 274, and therefore linear movement of the carriage assemblies 224, 226; 224' 226'.

Each cavity has a reaction member 260, 260' to which the rollers 220, 222; 220, 222' are operatively coupled by spherical joints such that the reaction members bear reaction loads arising from the respective rollers, substantially similar to the arrangement of the preceding embodiment. As in the preceding embodiment, each reaction member 260, 260' has reaction shafts, an end portion of one of which is retained within an aperture of the casing 200 of the variator. The other reaction shaft is secured by a yoke 286, 286' that has apertures through which the control rods 274, 274' pass.

The reaction members 260, 260' are operatively linked by a load-sharing assembly. The load-sharing assembly comprises a bar 290 mounted to the casing 286 by a pivot 292. The bar 290 is pivotally connected to the yokes 286, 286' symmetrically about the pivot 292. Therefore, an equal and opposite force is applied to each reaction member through its yoke, which ensures that an equal reaction torque is applied to the rollers 220, 222; 220, 222' in the two toroidal cavities.

Figure 10:
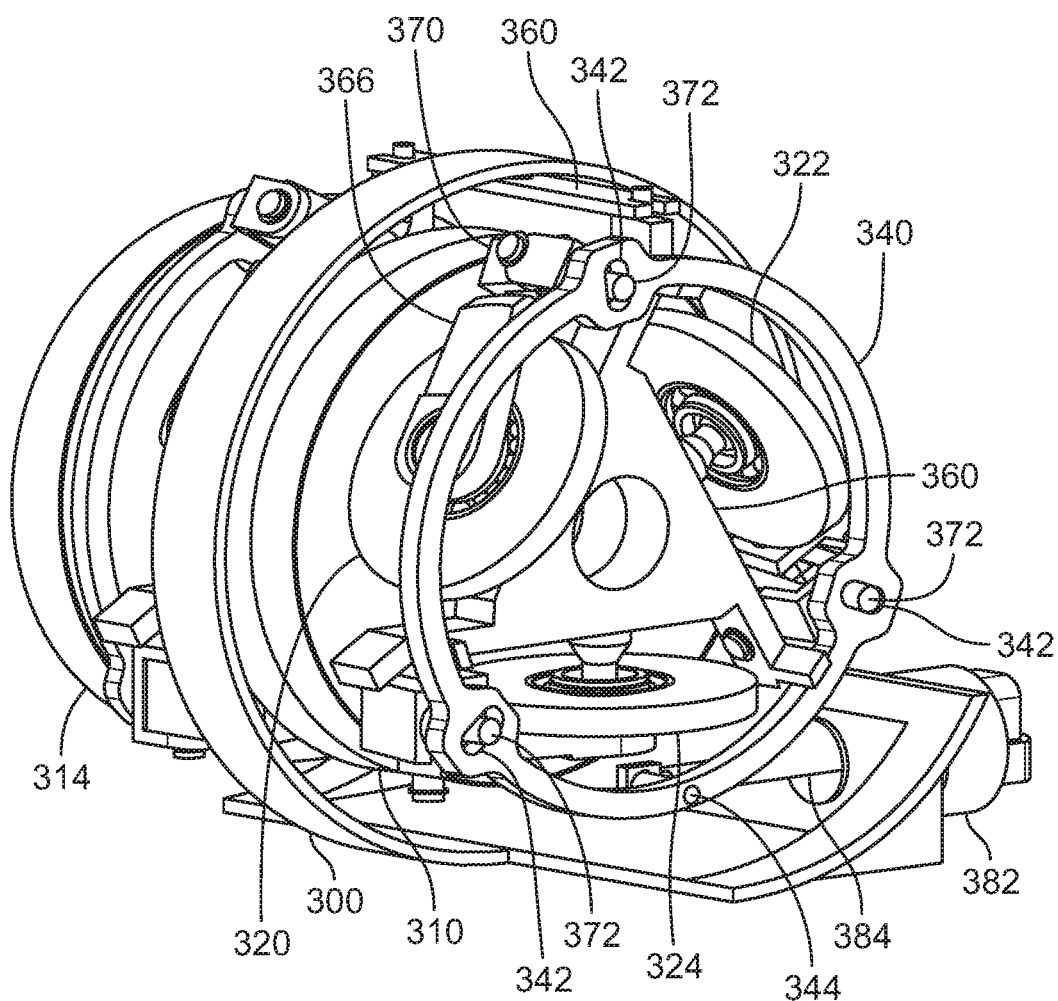
FIG. 10 is a perspective view of a variator being a fourth variator that is suitable for use in embodiments of the invention.
Figure 11:
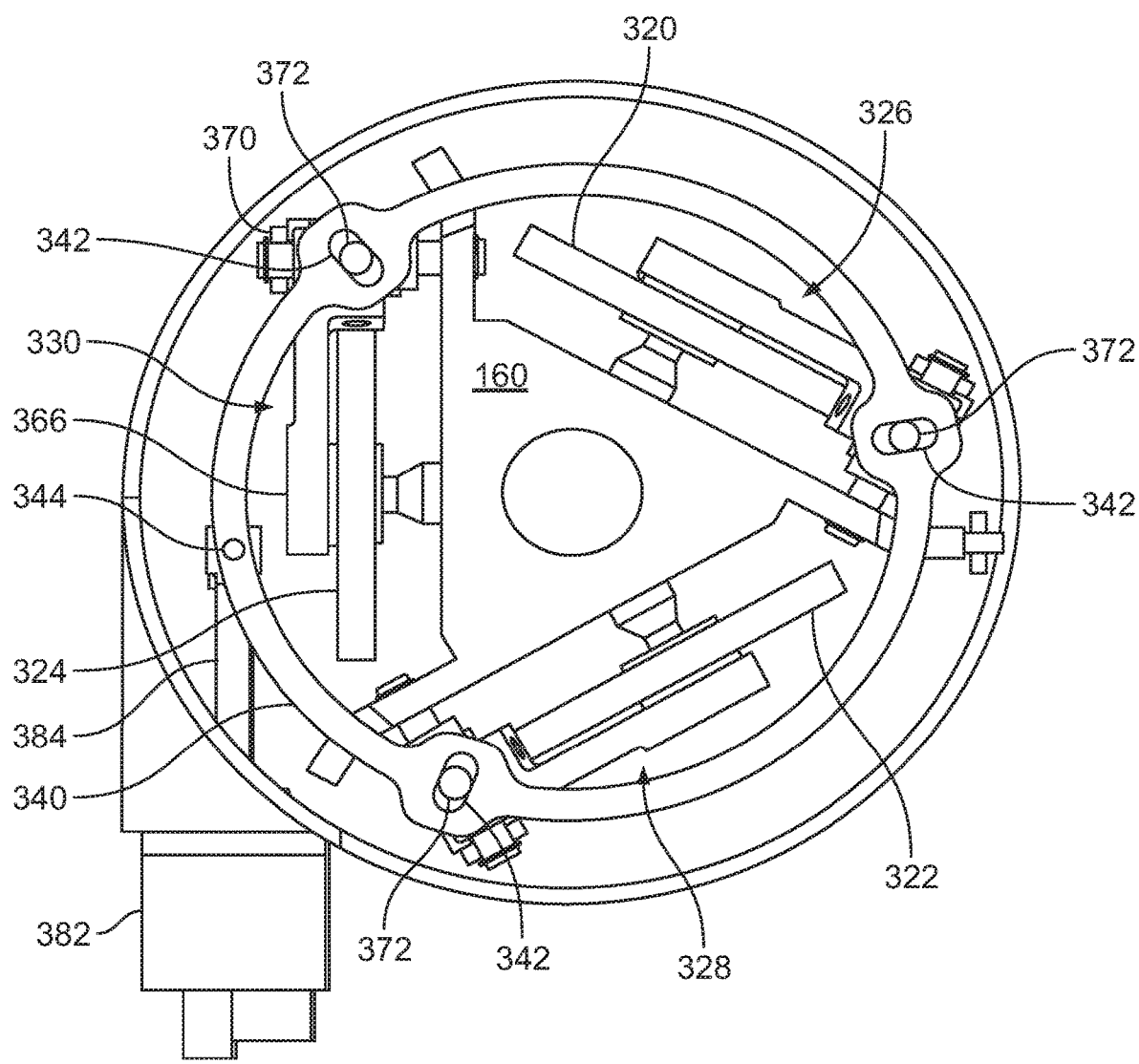
FIGS. 11 and 12 are an axial view and a top elevation of the variator of FIG. 10.
Figure 12:
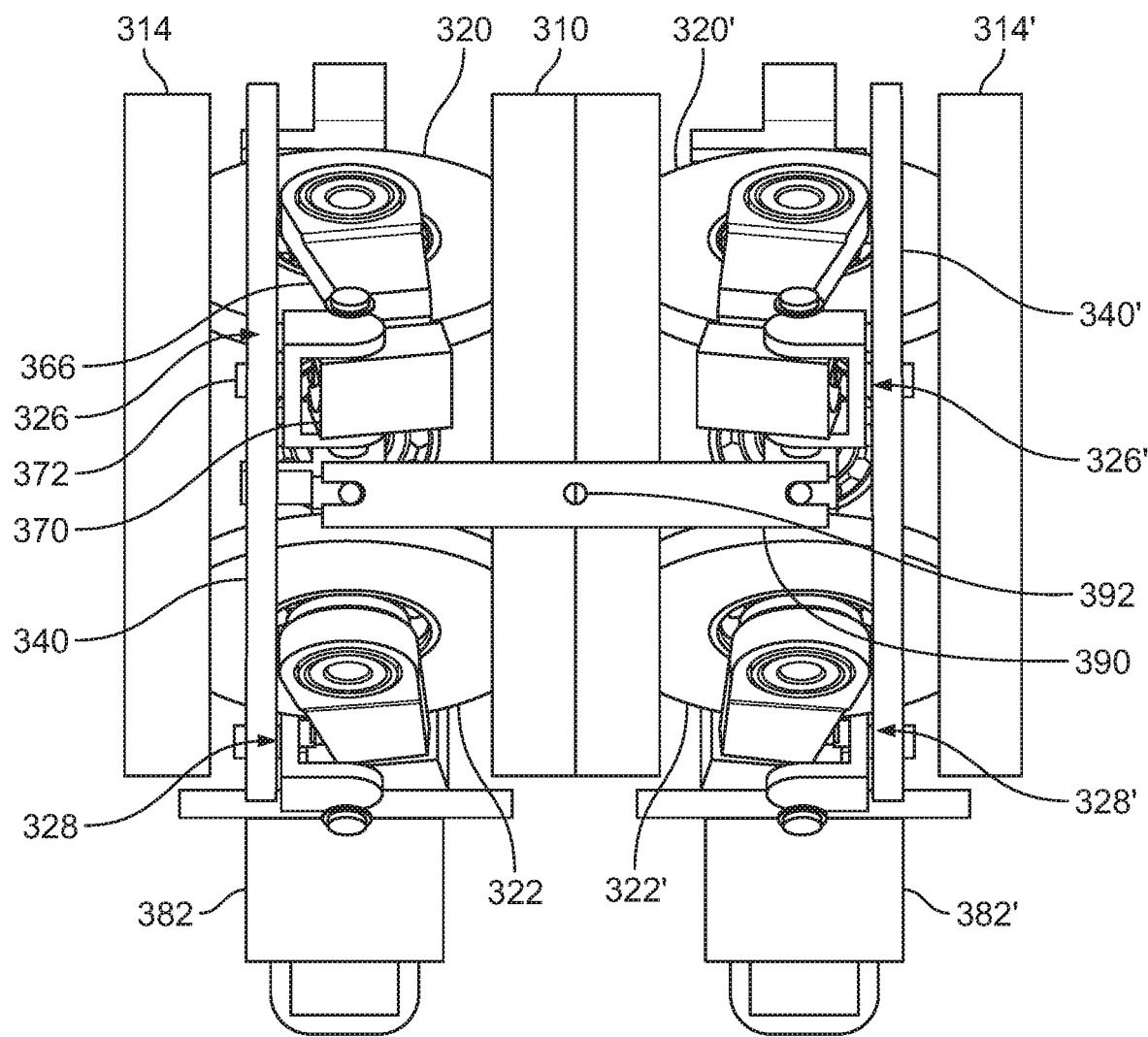

FIGS. 10 to 12 illustrate another embodiment of the invention. The variator comprises an input race 310 and similar first and second output races 314 (only one is shown) disposed, in the direction of the variator axis, to opposite sides of the input race 310. Within each of the two toroidal cavities defined by the races, there are three rollers 320, 322, 324; 320, 322' (one of which is not shown in the drawings).

The variator comprises a reaction member 360, 360' in each cavity. The reaction members 360, 360' are coupled to one another by a load balancing assembly that includes a bar 390 pivotally mounted on a casing 300 of the variator, each reaction member 360 being pivotally connected to the bar 390 symmetrically about its pivot 392.

Each roller 320, 322, 324; 320', 322 is carried for rotation by a respective carriage assembly 326, 328, 330; 326' 328' (one of which is not shown in the drawings). Each roller carriage assembly 320, 322, 324; 320', 322 comprises a carrier 366 and a mounting part 370. The roller 320 is mounted for rotation on the carrier 366. The carrier 366 is connected to the mounting part 370 such that it is free to undergo a tilting motion to change the tilt angle of the rollers 320, 322, 324; 320, 322 and thereby change the variator ratio. A control peg 372 projects from each mounting part.

An annular control member 340, 340' is provided in each cavity. Each control member 340, 340' has three radial slots 342 into each of which, one of the control pegs 372 is received. The variator further includes an actuator associated with each cavity. Each actuator comprises a body 382, 382' that is fixed to a casing 300 of the variator, and an actuator rod 384 (only one of which can be seen in the drawings) that can be driven linearly into or out of the cylinder by suitable application of an electrical signal or hydraulic fluid, as the case may be, to the actuator. Each actuator rod 384 is connected to a respective control member 340, 340' by a pivot 344, 344'. By this arrangement, operation of the actuator causes the control members 340, 340' to rotate, which, in turn, causes movement of the control pegs 370, and thus rotation of the carriers 366 on their respective mounting parts 370.

Figure 13:
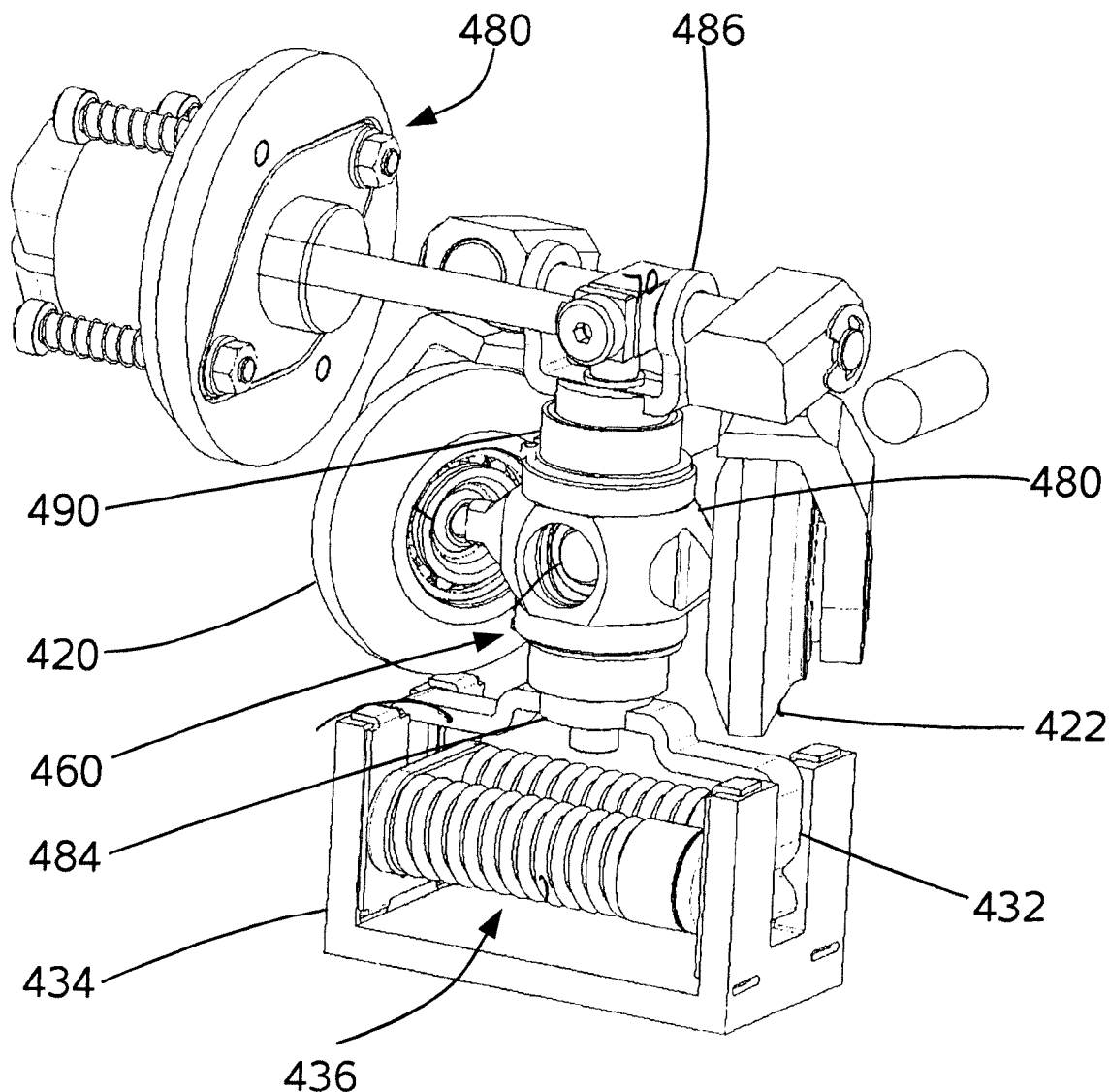
FIGS. 13 and 14 show a variator being a fifth variator that is suitable for use in embodiments of the invention.
Figure 14:
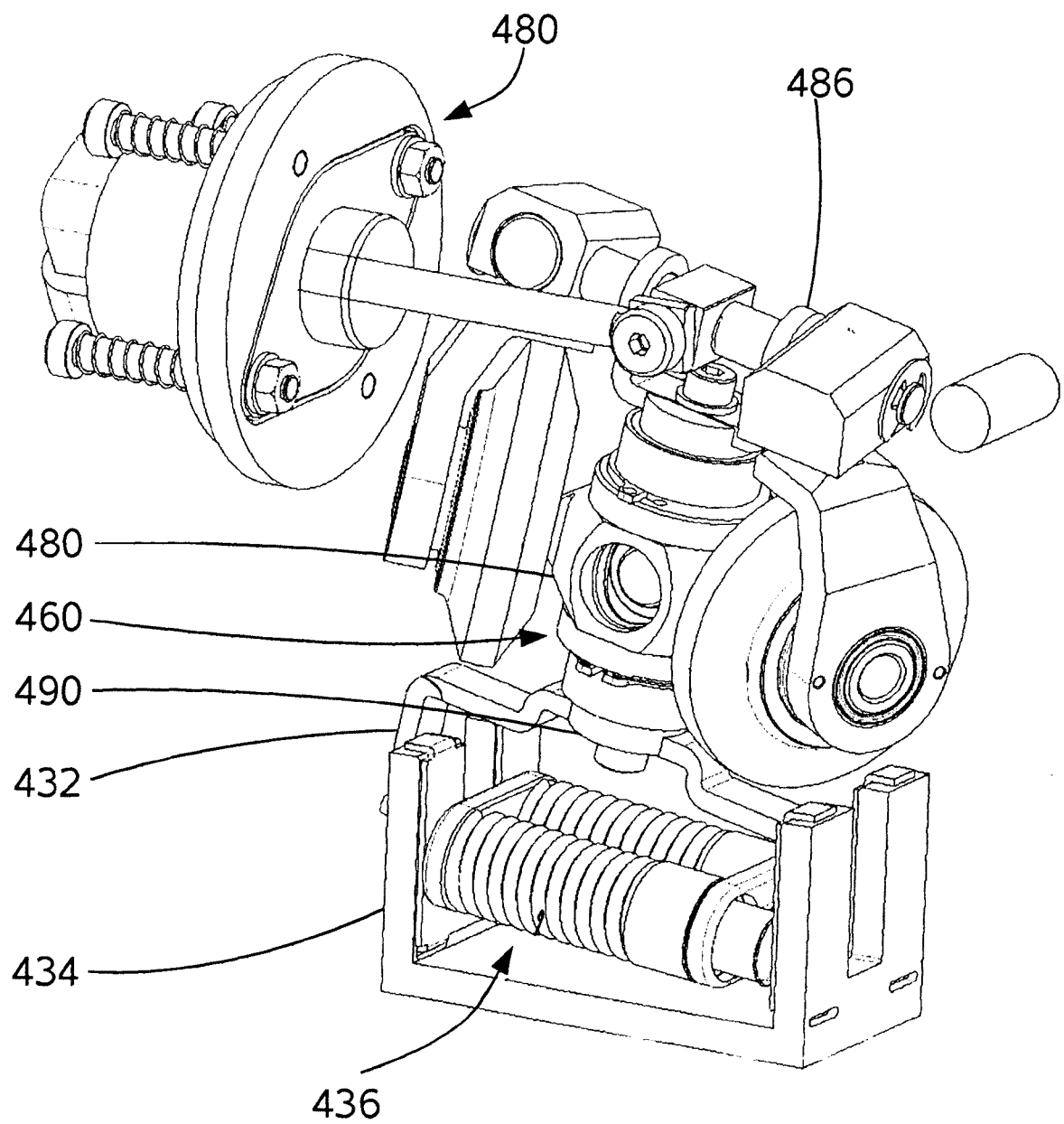

In FIGS. 13 and 14 the reaction member 460 is mounted for rotation about the variator axis in response to a reaction torque above a pre-determined level. The reaction member 460 comprises a body 480 having an aperture 482 through which a variator input shaft and/or output shaft may pass with clearance. Reaction shafts 484, 490 project coaxially and in opposite directions from the body 480 and are aligned normal to the variator axis within the centre plane of the variator. As in the second embodiment, one of the reaction shafts 490 is connected to an actuator 480 through a yoke 486. The other reaction shaft 490 is linked to a resilient mounting assembly 430.

In this embodiment, the resilient mounting assembly 430 includes a support bar 432 to which the reaction shaft 490 is connected and a cradle 434 that is connected to a casing of the variator. The support bar 432 is retained in the cradle by compressed springs 436 against which the reaction shaft 490 applies a torque reaction force. The reaction torque creates a couple on the support bar 432 and its rotation displaces transmission the reaction shaft 490. The springs 436 may be set to deflect when the force applied exceeds a certain threshold. The force imparted may be detected and employed to provide an input signal to the control member 470, for example such that the control member acts to reduce the reaction torque detected, thereby operating to reduce the torque passing through the variator.

In embodiments of the invention that incorporate a variator as described in the last-preceding paragraph, the variator is configured such that the reduction in ratio effected by the reaction member when the torque exceeds a threshold serves to complement the operation of the control system. Thus, if a transient change in operating conditions causes a sudden acceleration or deceleration of the engine, a variator with this configuration can protect components of the supercharging arrangement and associated components against damage from excessive torque.

It will be seen that in each of these embodiments, actuation of the variator to cause the rolling elements to pitch takes place substantially or entirely radially outwardly of the rolling elements. Thus, components that are responsible for performing actuation have minimal or no intrusion into the space between the rolling elements. In each of these embodiments, actuation of the variator to causes the rolling elements to pitch takes place in a space that does not extend beyond the races in a direction parallel to the variator axis. In many cases, when the variator is used as part of a larger transmission system, there is little or no available space beyond the races in the direction of the variator axis within which components can be packaged. In addition, in each embodiment, the axis about which the pitching rotation occurs is not coincident with a physical component such as a shaft and an axis—instead, it is defined by the constraints imposed upon the motion of the carriers by components (such as the actuation point and the reaction point) that are remote from the tilt axis.

Figure 15:
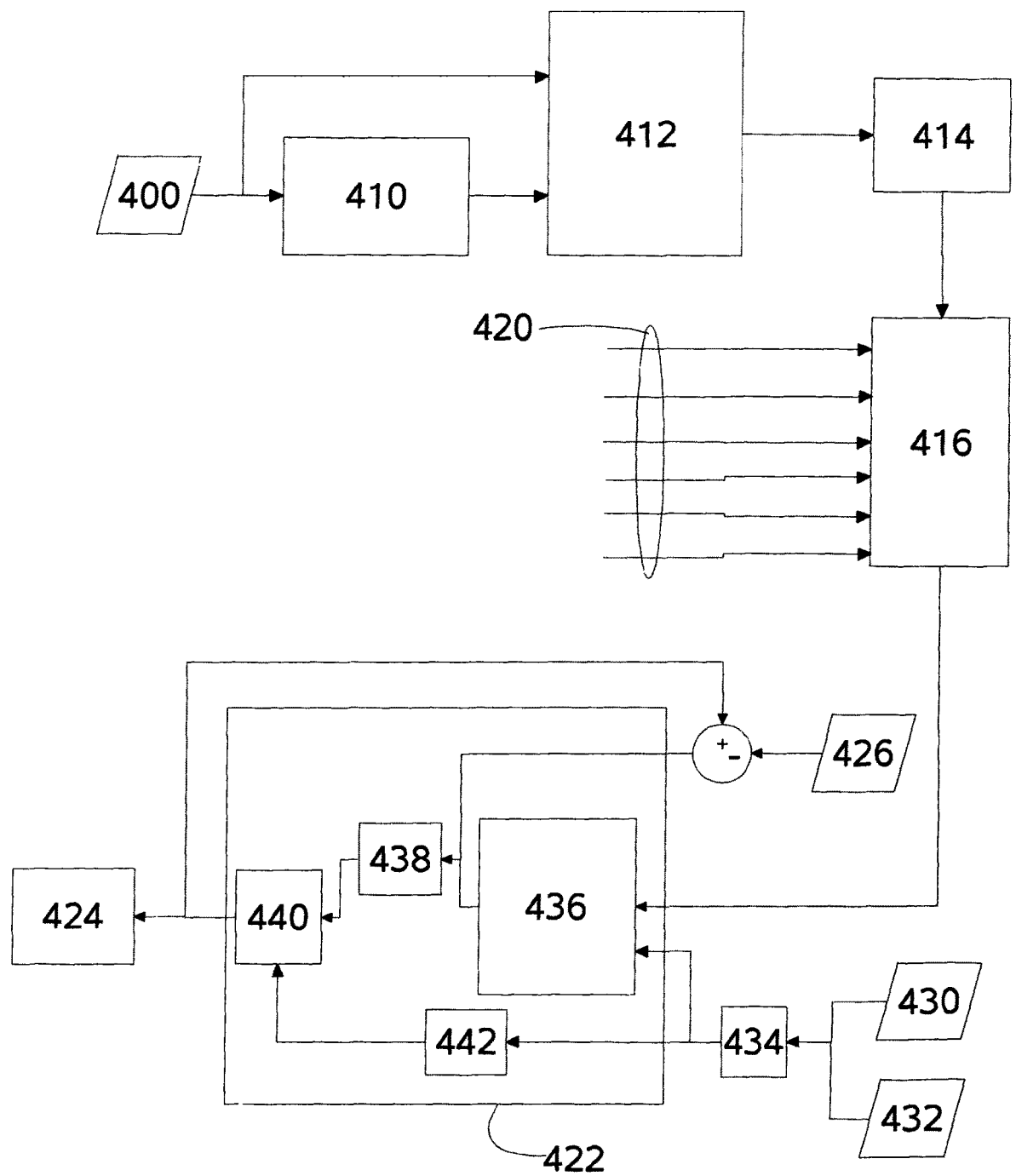
FIG. 15 is a diagram that illustrates control, by a control system, of a variator in a drive system embodying the invention.

In FIG. 15, the supercharging arrangement further includes a control system that operates to generate a signal to be applied to the actuator of the variator to cause it to operate at a specific ratio $R_v$, the aim being to optimise operation of the internal combustion engine 70.

The control system responds to the position of an operating control such as an accelerator pedal of a vehicle (or to some other control arrangement such as a cruise control) which gives the required engine operating request to effect the intentions of an operator of the vehicle. This generates a supercharger control variable request which could be a supercharger compressor speed, a supercharger air pressure, a mass air flow or an engine torque output directly. The chosen control variable request will then serve as the main control input in a closed loop control strategy. In this embodiment, this is achieved by calculating the air pressure that should appear at the outlet of the supercharger 80. This generates a supercharger air pressure request 400. The control system then calculates the mass airflow required to achieve the supercharger air pressure request at the current engine speed $\omega_c$. A supercharger compressor map 412 is then used to determine the speed of the supercharger that would achieve the mass airflow request, and form that generates a supercharger speed request. From that, a variator ratio request can be calculated at 414.

Typically, it is undesirable to apply a step change in supercharger speed request. Instead, the supercharger speed request is modified at 416 such that it falls within saturation limits that are dependent upon a range of instantaneous operational parameters 420. These parameters may include (potentially amongst others):
- the variator ratio (derived from measured variator input and output speeds), to ensure that the request does not cause the variator to attempt to adopt a ratio outside of its operating range;
- the output speed of the variator, to ensure that the request does not cause the variator to attempt to exceed its maximum output speed;
- the supercharger speed, to ensure that the request does not cause the supercharger to attempt to exceed its maximum operational speed;
- the power and torque to be transmitted by the variator (which can be derived from the mass airflow request and the supercharger air pressure request) to ensure that these do not exceed maximum operational values.

The saturated supercharger speed request is used as the main input to a closed-loop control stage 422, which has an output that is a linear position request supplied to drive the actuator 424 that directly controls the variator. This stage can either be open-loop if an actuator with a known linear position is used such as a stepper motor, or closed-loop if a non-positional actuator is used; the present embodiment adopts the latter arrangement. The closed-loop control stage 422 also has an error input that is the difference between the linear position request appearing at its output and the measured linear position 426. Further inputs to the closed-loop control stage 422 include the measured mass airflow 430 and the measured supercharger pressure ratio 432, which are combined at 434 to derive a signal indicative of the variator torque.

The rate of change of the variator ratio is then limited either by calculating the maximum rate of change of linear position or by using the mechanical torque limiting device as described earlier, if fitted. In either case the function and ruling equation is the same. The rate of change of ratio is required so that the inertial torques generated by accelerating the supercharger do not exceed the variator design envelope.

Within the closed-loop control stage 422, a feed-forward control stage 436 processes the saturated CVT ratio request to derive an actuator position value, for example, using a look-up table and, in cases where the variator includes a torque-limiting arrangement, the variator torque. The derived actuator position value is combined at 438 with the error input to calculate the actuator position value. The actuator position value is passed through a value-change limiting stage 440 before being passed to the output as the linear position request supplied to drive the actuator 424.

Thus, the feed-forward control stage 442 uses a chosen control variable to calculate a required supercharger operating point for given current engine conditions. Then, the supercharger operating point request and current engine operating conditions are used to determine a supercharger compressor speed that would achieve that request (this is the feed forward request). In addition, the closed loop system then modifies this feed-forward supercharger speed request to try and take out any error in the main control variable and current conditions.

The function of the value-change limiting stage 440 is to limit the rate of change in the output speed $\dot{\omega}_v$ of the variator—that is, it ensures that $\dot{\omega}_v < \dot{\omega}_{v_{max}}$. The value of $\dot{\omega}_{v_{max}}$ is calculated at 442 and passed to an input of the value-change limiting stage 440, where $$\dot{\omega}_{v_{max}} = \frac{\text{Maximum variator torque} - \text{Instantaneous measured variator torque}}{\text{Inertia at the output of the variator}}.$$

The invention claimed is:

1. A supercharging arrangement comprising:
an internal combustion engine including an inlet manifold;
a supercharger having a rotational input and an output in communication with the inlet manifold, wherein the supercharger is configured to supply pressurized air at the output to the inlet manifold;
a variable-speed drive unit having a rotational input configured to receive a rotational speed output from the internal combustion engine during operation of the supercharging arrangement and an output in communication with the rotational input of the supercharger, wherein the variable-speed drive unit has a variator in communication with the rotational input of the variable-speed drive unit and the rotational input of the supercharger and the variator operates according to a specific operating ratio during operation of the supercharging arrangement;
an actuator in communication with the variator; and
a control system in communication with the internal combustion engine and the actuator that is configured to receive instantaneous operational parameters of the internal combustion engine during operation of the supercharging arrangement, wherein the control system is operative to calculate an estimated supercharger air pressure that is representative of the pressurized air at the output of the supercharger during operation of the supercharging arrangement and generate a signal that is output to the actuator to operatively position the actuator such that the variator is controlled to the specific operating ratio, and wherein the generated signal is based, at least in part, on the instantaneous operational parameters of the internal combustion engine that are received by the control system and the calculated estimated supercharger air pressure.

2. The supercharging arrangement according to claim 1 in which the variator is toroidal.

3. The supercharging arrangement according to claim 1 in which the control system is operative to calculate a target value of a control variable.

4. The supercharging arrangement according to claim 1 in which the variator comprises:
an input surface and an output surface, the input and output surfaces being coaxially mounted for rotation about a variator axis, and a first toroidal cavity being defined between the input and output surfaces;
a plurality of rolling elements disposed between and being in driving engagement with the input and the output surfaces at respective contact regions, each of the rolling elements being mounted on a carriage assembly for rotation about a rolling axis, each of the rolling elements being free to pivot about a tilt axis, the tilt axis passing through each of the rolling elements perpendicular to the rolling axis, and intersecting the rolling axis at a roller center, whereby a change in the tilt angle causes a change in the specific operating ratio of the variator being the ratio of rotational speeds of the input and output surfaces.

5. The supercharging arrangement according to claim 4 in which each carriage assembly mounted to one of the roller elements can cause pivotal movement, which pivotal movement is about a pitch axis that results in a change of a pitch angle of the rolling element associated with each carriage assembly, the pitch axis passing through the roller center and through the contact regions; and wherein the variator further comprises a control member operative to cause a respective carriage assembly to undertake the pivotal movement thereby changing the pitch angle, so urging the plurality of rolling elements to pivot about their tilt axes and thereby provide the change in the specific operating ratio of the variator.

6. The supercharging arrangement according to claim 5 in which movement of each carriage assembly of the variator about each pitch axis is caused by one or more components of the variator moving other than in rotation about each pitch axis.

7. The supercharging arrangement according to claim 5 in which the variator further comprises:
a second input surface and a second, facing output surface defining a second toroidal cavity;
a second plurality of rolling elements disposed between the second input and second output surfaces and being in driving engagement with the surfaces, each rolling element being rotatably mounted on its respective carriage assembly and able to tilt about an axis passing through the center of the rolling element in order to change the variator ratio and being mounted for pivotal movement resulting in the rolling element pitching about an axis passing through the center of the rolling element and perpendicular to the rotational axis of the rolling element and also perpendicular to the ratio change axis;
a control member for actuation of the each carriage assembly to pitch the respective rolling element resulting in a change of tilt angle and a change in the specific operating ratio of the variator;
a first reaction member operatively coupled to the plurality of rolling elements in the first cavity and a second reaction member operatively coupled to the second plurality of rolling elements in the second cavity such that the first and second reaction members bear reaction loads arising from the respective rolling elements.

8. The supercharging arrangement according to claim 7 in which the variator further comprises a load-sharing assembly operatively linked to the reaction members of the first and the second toroidal cavities such that reaction torque from the reaction members is balanced.

9. The supercharging arrangement according to claim 1 in which the variator includes a torque sensing arrangement that is operative to reduce the specific operating ratio of the variator when the torque applied by the variator to the supercharger exceeds a threshold.

10. A drivetrain for a vehicle comprising a supercharging arrangement according to claim 1.

11. The drivetrain according to claim 10 in which the control system operates to cause the variator to operate at the specific operating ratio that causes a control variable of the drivetrain to approach a target value.

12. The supercharging arrangement according to claim 1 in which the control system is operative to adjust the specific operating ratio to ensure that a supercharger speed changes at such a rate that ensures a torque that is applied to an output of the internal combustion engine does not exceed a predetermined limit.

13. The supercharging arrangement according to claim 1 further comprising a step-up gearset coupled in series with the variator, in which the step-up gearset is connected between the variator and the supercharger, wherein the step-up gearset is a traction drive epicyclic gearset, and wherein the epicyclic gearset shares traction fluid with the variator.

14. The supercharging arrangement according to claim 1 in which the supercharger incorporates a centrifugal compressor or a positive displacement compressor.

15. A supercharging arrangement comprising:
an internal combustion engine including an inlet manifold;
a supercharger having a rotational input and an output in communication with the inlet manifold, wherein the supercharger is configured to supply pressurized air at the output to the inlet manifold;
a variable-speed drive unit having a rotational input configured to receive a rotational speed output from the internal combustion engine during operation of the supercharging arrangement and an output in communication with the rotational input of the supercharger, wherein the variable-speed drive unit has a variator in communication with the rotational input of the variable-speed drive unit and the rotational input of the supercharger and the variator operates according to a specific operating ratio during operation of the supercharging arrangement; and
a control system operative to set the specific operating ratio of the variator and to calculate a target value of a control variable, wherein the control system is operative to calculate an air pressure at an outlet of the supercharger.

16. The supercharging arrangement according to claim 15 in which the control system is operative to calculate a target variator ratio to achieve the specific operating ratio such that a speed at which the supercharger operates approaches thereto to achieve the target value of the control variable.

17. The supercharging arrangement according to claim 15 wherein the control system is operative to generate a supercharger speed request using a supercharger compressor map.

18. The supercharging arrangement according to claim 17 wherein the control system is operative to calculate a variator ratio request from the supercharger speed request to achieve the specific operating ratio.

19. The supercharging arrangement according to claim 17 wherein the control system is operative to modify the supercharger speed request such that the supercharger speed request falls within saturation limits that are dependent upon at least one of the following: the specific ratio of the variator, variator output speed, supercharger speed, and torque transmitted by the variator.

20. A supercharging arrangement comprising:
an internal combustion engine including an inlet manifold;
a supercharger having a rotational input and an output in communication with the inlet manifold, wherein the supercharger is configured to supply pressurized air at the output to the inlet manifold;
a variable-speed drive unit having a rotational input configured to receive a rotational speed output from the internal combustion engine during operation of the supercharging arrangement and an output in communication with the rotational input of the supercharger, wherein the variable-speed drive unit has a variator in communication with the rotational input of the variable-speed drive unit and the rotational input of the supercharger and the variator operates according to a specific operating ratio during operation of the supercharging arrangement; and a control system operative to set the specific operating ratio of the variator and to accelerate the supercharger at a rate that is a function of an error value, or proportional to an error value, that is the difference between a target speed and an actual speed of the supercharger.

\* \* \* \* \*